US011295206B2

(12) United States Patent
Rajamani et al.

(10) Patent No.: US 11,295,206 B2
(45) Date of Patent: Apr. 5, 2022

(54) INTERLEAVING MEMORY REQUESTS TO ACCELERATE MEMORY ACCESSES

(71) Applicant: Google LLC, Mountain View, CA (US)

(72) Inventors: Gurushankar Rajamani, Sunnyvale, CA (US); Alice Kuo, Livermore, CA (US)

(73) Assignee: Google LLC, Mountain View, CA (US)

( * ) Notice: Subject to any disclaimer, the term of this patent is extended or adjusted under 35 U.S.C. 154(b) by 32 days.

(21) Appl. No.: 16/874,894

(22) Filed: May 15, 2020

(65) Prior Publication Data

US 2021/0248451 A1    Aug. 12, 2021

Related U.S. Application Data

(60) Provisional application No. 62/971,884, filed on Feb. 7, 2020.

(51) Int. Cl.
| | |
|---|---|
| *G06N 3/063* | (2006.01) |
| *G06F 3/06* | (2006.01) |
| *G06N 3/04* | (2006.01) |

(52) U.S. Cl.
CPC ........... *G06N 3/063* (2013.01); *G06F 3/0611* (2013.01); *G06F 3/0659* (2013.01); *G06F 3/0673* (2013.01); *G06N 3/04* (2013.01)

(58) Field of Classification Search
CPC ........ G06N 3/063; G06N 3/04; G06F 3/0611; G06F 3/0659; G06F 3/0673
See application file for complete search history.

(56) References Cited

U.S. PATENT DOCUMENTS

| | | |
|---|---|---|
| 6,745,277 B1 | 6/2004 | Lee et al. |
| 6,823,403 B2 | 11/2004 | Gulick et al. |
| 8,285,330 B2 | 10/2012 | Lee et al. |
| 8,443,147 B2 | 5/2013 | Brewer et al. |
| 8,566,515 B2 | 10/2013 | Rubinstein et al. |
| 2006/0294327 A1 | 12/2006 | Sharma et al. |

(Continued)

OTHER PUBLICATIONS

Schmidt et al, "A Review of Common Belief on Power Management and Power Consumption" White Paper, 2009, 13 pages.

(Continued)

*Primary Examiner* — Eric Nilsson
(74) *Attorney, Agent, or Firm* — Fish & Richardson P.C.

(57) ABSTRACT

Methods, systems, and apparatus, including computer-readable media, are described for interleaving memory requests to accelerate memory accesses at a hardware circuit configured to implement a neural network model. A system generates multiple requests that are processed against a memory of the system. Each request is used to retrieve data from the memory. For each request, the system generates multiple sub-requests based on a respective size of the data to be retrieved using the request. The system generates a sequence of interleaved sub-requests that includes respective sub-requests of a first request interleaved among respective sub-requests of a second request. Based on the sequence of interleaved sub-requests, a module of the system receives respective portions of data accessed from different address locations of the memory. The system processes each of the respective portions of data to generate a neural network inference using the neural network model implemented at the hardware circuit.

20 Claims, 6 Drawing Sheets

(56) References Cited

U.S. PATENT DOCUMENTS

| | | | |
|---|---|---|---|
| 2012/0159037 A1* | 6/2012 | Kwon | G06F 13/4022 |
| | | | 710/317 |
| 2017/0221176 A1 | 8/2017 | Munteanu et al. | |
| 2018/0300933 A1 | 10/2018 | Burke et al. | |
| 2019/0156214 A1 | 5/2019 | Matveev et al. | |
| 2019/0251034 A1* | 8/2019 | Guim Bernat | G06F 9/5061 |
| 2019/0303310 A1* | 10/2019 | Richter | G06F 3/061 |
| 2019/0310948 A1* | 10/2019 | Abhishek Raja | G06F 12/1036 |
| 2020/0097807 A1* | 3/2020 | Knag | G06N 3/0454 |
| 2020/0159658 A1* | 5/2020 | Gong | G06F 13/1647 |

OTHER PUBLICATIONS

PCT International Search Report and Written Opinion in International Application No. PCT/US2021/016591, dated May 31, 2021, 12 pages.

* cited by examiner

Example Hashing Scheme bank[0] = bitwise_xor(address[35:8] & 0x1111111);
bank[1] = bitwise_xor(address[35:8] & 0x2222222);
bank[2] = bitwise_xor(address[35:8] & 0x4444444);
bank[3] = bitwise_xor(address[35:8] & 0x8888888);
. . .

602

| Address | Bank |
|---|---|
| 0 | 0 |
| 8K (0x2000) | 2 |
| 16K (0x4000) | 4 |
| 24K (0x8000) | 8 |
| 32K (0x10000) | 1 |
| 40K (0x12000) | 3 |
| 48K (0x14000) | 5 |

604

Fig. 6

INTERLEAVING MEMORY REQUESTS TO ACCELERATE MEMORY ACCESSES

CROSS REFERENCE TO RELATED APPLICATION

This application claims the benefit of U.S. Provisional Application No. 62/971,884, filed Feb. 7, 2020, the contents of which are incorporated by reference herein.

BACKGROUND

This specification generally relates to circuitry for a hardware circuit used to perform neural network computations.

Neural networks are machine-learning models that employ one or more layers of nodes to generate an output, e.g., a classification, for a received input. Some neural networks include one or more hidden layers in addition to an output layer. The output of each hidden layer is used as input to one or more other layers in the network, e.g., other hidden layers or the output layer of the network. Some of the layers of the network generate an output from a received input in accordance with current values of a respective set of parameters. Some neural networks are convolutional neural networks (CNNs) configured for image processing or recurrent neural networks (RNNs) configured for speech and language processing.

A neural network layer of a CNN can have an associated set of kernels, which may correspond to parameters or weights. The associated set of kernels are used to process inputs (e.g., a batch of inputs) through the neural network layer to generate a corresponding output of the layer for computing a neural network inference. A batch of inputs and set of kernels can be represented as a tensor, i.e., a multi-dimensional array, of inputs and weights. A hardware circuit that implements a neural network includes memory with locations that are identified by an address value. The memory locations can correspond to elements of a tensor and the tensor elements may be traversed or accessed using control logic of the circuit. For example, the control logic can determine or compute a memory address value of an element to load or store the corresponding data value of the element.

SUMMARY

This document describes a hardware circuit with an improved architecture that is used to implement data processing techniques for interleaving multiple requests to access and retrieve data from address locations of a memory. More specifically, the memory access requests are interleaved to accelerate memory accesses at a computing system that includes the hardware circuit. The hardware circuit is configured to implement a neural network model that is used to compute a neural network inference using the data retrieved from the address locations of the memory.

The system generates multiple requests that are executed to access the memory locations, and each request is used to retrieve data values for processing through neural network layers of the model. For each request, the system generates multiple sub-requests based on a respective size of the data to be retrieved using the request. The system generates a sequence of interleaved sub-requests that includes respective sub-requests of a first request interleaved among respective sub-requests of a second request.

The sequence of interleaved sub-requests are executed by a memory controller of the system to retrieve the data values in accordance with parameters of each sub-request. Based on the sequence of interleaved sub-requests, a reorder buffer included in a trans-unroller module of the system receives respective portions of data accessed from different address locations of the memory. The system processes each of the respective portions of data to generate the neural network inference using the neural network model implemented at the hardware circuit.

One aspect of the subject matter described in this specification can be embodied in a method for generating a neural network output for a neural network using a system including memory and a hardware circuit configured to implement the neural network. The method includes generating multiple requests, each request being used to retrieve data from the memory. For each request of the multiple requests, the method includes: generating multiple sub-requests based on a respective size of the data to be retrieved using the request. The method also includes generating a sequence of interleaved sub-requests that includes respective sub-requests of a first request interleaved among respective sub-requests of a second request; receiving, based on the sequence of interleaved sub-requests, respective portions of data that were accessed from respective address locations of the memory; and processing, using the neural network implemented at the hardware circuit, each of the respective portions of data to generate the neural network output.

These and other implementations can each optionally include one or more of the following features. For example, in some implementations, the hardware circuit includes a reorder buffer and the method includes: receiving, at the reorder buffer, the respective portions of data in an order that coincides with the sequence of interleaved sub-requests; and reordering, by the reorder buffer, respective portions of data that correspond to the first request to form the data to be retrieved using the first request.

In some implementations, the hardware circuit includes a reorder buffer and the method includes: receiving, at the reorder buffer, the respective portions of data in an order that coincides with the sequence of interleaved sub-requests; and reordering, by the reorder buffer, respective portions of data that correspond to the second request to form the data to be retrieved using the second request; or providing, by the reorder buffer, respective portions of data that correspond to the second request without reordering the respective portions of data that correspond to the second request.

The method includes, for each request of the multiple requests, generating a hash value for the request based on address bits in the request that identify at least one address location in the memory that stores a portion of the data to be retrieved using the request. In some implementations, the method includes determining a bank assignment of the request based on the hash value for the request. The bank assignment indicates a memory bank of the memory to be accessed when the system processes the request to retrieve data from the memory.

Generating the sequence of interleaved sub-requests can include generating the sequence of interleaved sub-requests based on a respective bank assignment of the first request and a respective bank assignment of the second request. In some implementations, generating the sequence of interleaved sub-requests includes: identifying a respective transaction type of the first request; identifying a respective transaction type of the second request; and causing the respective sub-requests of the first request to be interleaved among the respective sub-requests of the second request based on the respective transaction type of the first and second requests.

Generating the multiple sub-requests can include generating the multiple sub-requests based on a threshold quantity of data that is accessible during a single memory cycle that is executed to access an address location of the memory. In some implementations, generating the multiple sub-requests includes: parsing the request based on the respective size of the data to be retrieved and a threshold quantity of data that is accessible from the single memory cycle; in response to parsing the request, forming respective portions of the request; and generating the multiple sub-requests using each of the respective portions of the request. Each of the respective portions of the request can correspond to the threshold quantity of data that is accessible from the single memory access cycle.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular embodiments so as to realize one or more of the following advantages.

Techniques are described that can be implemented to optimize how a memory controller executes and ultimately performs multiple small (or discrete) memory access operations against memory banks in a large system memory. The memory access operations are performed to access various address locations that each store a data value used by a predictive model to compute an inference (or to train the model). The system memory stores a large quantity of data values in a distributed manner across various banks of the memory, which can cause inefficiencies when processing multiple non-linear requests, such as requests that require reading data values that are stored in address locations across the various disparate memory banks of the system memory.

The improved circuit architecture and data processing techniques described in this document can be used to optimize how the multiple small memory access operations are carried out by interleaving respective sub-requests of one request among the respective sub-requests of another request. For example, the sub-requests can be interleaved in a way that allows for multiple consecutive requests to be performed against different bank groups of the system memory without incurring penalties relating to "bubbles" (e.g., idle cycles) that are required when back-to-back read requests are issued to the same bank of addresses.

More specifically, by interleaving sub-requests such that each sub-request is processed against a different bank group of a given memory quadrant, the improved processing technique can be used to mitigate the need to issue back-to-back read requests (or sub-requests) to the same bank of addresses, thereby precluding the need to insert an idle memory cycle between two such back-to-back requests. This reducing the amount of, or need for, idle cycles translates to increases in system bandwidth and processing efficiency, as well as reductions in total power consumption at the hardware circuit.

Further, the interleaved memory requests are executed against the system memory to accelerate obtaining input data values that are processed by the model, which can lead to enhances in the speed of computing an inference at the model.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 6 is a block diagram that illustrates an example implementation of a hashing scheme.

Like reference numbers and designations in the various drawings indicate like elements.

DETAILED DESCRIPTION

This specification describes a hardware circuit and data processing techniques that are implemented using an architecture of the hardware circuit that is improved relative to prior designs. The hardware circuit can be a special-purpose processor, such as a neural network processor, an application specific integrated circuit (ASIC), or a hardware accelerator. The hardware circuit is configured to implement a neural network that includes multiple neural network layers.

The improved architecture and data processing techniques described in this document allow a system that includes high-bandwidth memory and a circuit representing a hardware accelerator to realize increases in speed, processing stability, and bandwidth when the system is required to perform multiple randomized accesses across memory banks of the high-bandwidth memory. The system performs the accesses to retrieve data values stored at address locations of the memory and routes the data values to the hardware accelerator. The data values received by the hardware accelerator are processed through layers of a CNN, RNN, or other type of neural network implemented at the hardware accelerator. For example, the data values are processed to generate outputs corresponding to a neural network inference.

Figure 1:
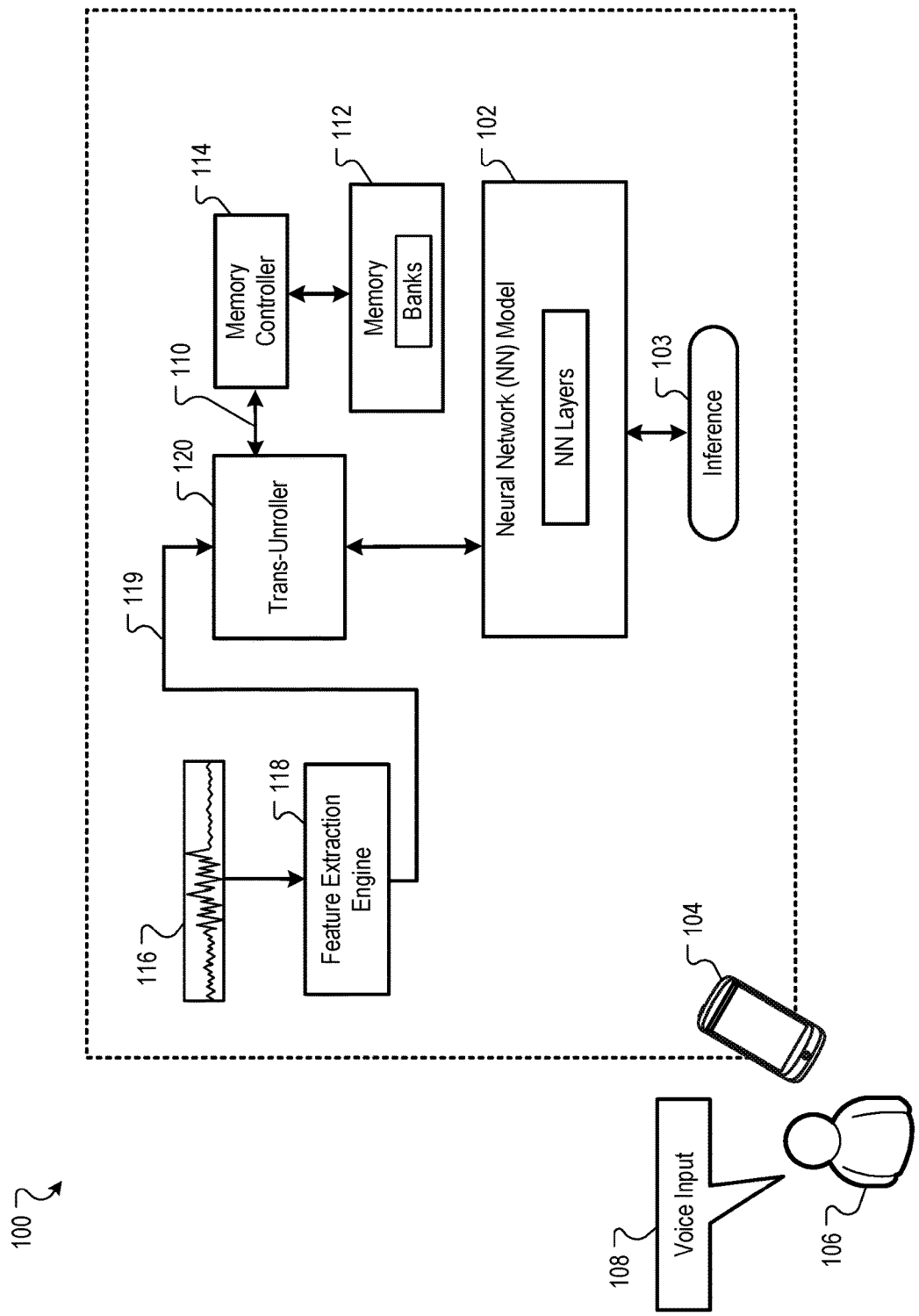
FIG. 1 is a block diagram of an example computing system that is configured to generate an inference.

FIG. 1 is a diagram showing an example computing system 100 ("system 100"). System 100 includes an example machine-learning model 102 that is implemented using a neural network. In some implementations, the model 102 is operable to compute inferences 103 for performing functions, such as image recognition, language detection, or object detection.

The system 100 includes an example hardware circuit. As noted above, the hardware circuit can represent a hardware accelerator or some other special-purpose processor. In some cases, the system 100 is an example computing system for accelerating tensor or neural network computations associated with artificial deep neural networks (DNNs), such as RNNs or CNNs. For instance, the system 100 is configured to implement a CNN on an example hardware accelerator and pass data values to the hardware accelerator to generate outputs for computing an inference 103 (described below).

In some implementations, system 100 is a system-on-chip that includes the hardware circuit as well as other components and devices that can be used to perform the operations described in this document. The hardware circuit may be a hardware accelerator configured to accelerate an example neural network model 102. For example, execution of the neural network model 102 may be accelerated relative to execution of the model on an example general-purpose machine, such as a central processing unit (CPU). Similarly, performance and execution of the neural network model may be accelerated relative to implementation of the model on another hardware accelerator, such as a graphics processing unit (GPU) that does not have the improved hardware features and processing techniques described in this specification.

The model 102 may be a trained image or speech recognition model that runs on a mobile device 104. For example, model 102 can be a quantized image recognition model that is deployed on the mobile device 104 to compute inferences entirely on the mobile device. The mobile device 104 can be an example smartphone, tablet, laptop, smartwatch, wearable device, electronic workbook, or other related portable electronic user devices. In some cases the model 102 can be deployed on devices such as a smart speaker or other smart devices to compute inferences on those devices. In some other implementations, the model 102 runs on computing servers of a data center or a cloud infrastructure that is based on computing assets of the data center. The model 102 is operable to process data corresponding to features extracted from input data such as audio or images.

As used in this document, computing an inference using a neural network model 102 includes processing input data through layers of the neural network model 102 to obtain predictions. In this manner, the described techniques can be implemented to provide input data to many different types of models in response to processing interleaved memory requests 110. References to speech and image recognition models 102 are included simply to illustrate examples of at least two types of models 102 that can receive input data in response to processing the interleaved memory requests 110 using the described techniques. The interleaved requests 110 are processed to read data values from distributed memory locations of memory 112 based on control signals generated by memory controller 114. For example, the interleaved requests 110 are processed by memory controller 114 to accelerate obtaining input data from memory 112 and routing the data for processing to compute an inference or to train a neural network model.

Memory 112 can be a dynamic random access memory (DRAM) of system 100. In some implementations, the memory 112 is a known high-bandwidth (e.g., double data rate), high-speed memory, such as GDDR5, that can include N number of memory banks, where N is an integer greater than or equal to one. In some implementations, memory 112 is a high-bandwidth external (or off-chip) memory relative to an example hardware circuit for hardware accelerator or neural network processor. The memory 112 can be configured to exchange data communications with on-chip memory resources of a hardware accelerator or special-purpose processor of system 100. For example, memory 112 can be disposed at a physical location that is outside of an integrated circuit die that represents a neural network processor that implements the neural network model 102. Alternatively, memory 112 can be local to, or co-located with, memory of a special-purpose processor.

In the example of FIG. 1 the input data is based on an utterance from a user 106. The utterance corresponds to voice input 108 received by a mobile device 104 that runs the neural net model 102. An example operation performed using system 100 includes model 102 being trained and deployed as an automated speech (or object) recognition model that processes input data (e.g., audio or image data) to compute an inference about the input data. For example, the model 102 can process audio data associated with an utterance to generate a transcription of the utterance based on numerical values that represent a term in the utterance. The numerical values are derived from energy signals corresponding to an acoustic waveform 116 of the utterance. In some implementations, the numerical values are derived for energy signals corresponding to the acoustic waveform 116 using a feature extraction engine 118.

In a speech processing example, the feature extraction engine 118 processes the audio data to extract or derive a set of feature values (e.g., numerical values) that are indicative of acoustic characteristics of the utterance. For example, the numerical values derived using the feature extraction engine 118 can represent features such as: i) terms or words in the utterance and ii) a location of the user 106 when the input data is received. In some implementations, the feature values may be mel-frequency cepstral coefficients.

The system 100 obtains corresponding data values from memory 112 based on one or more of the numerical feature values derived from the feature extraction engine 118. For example, the system 100 uses the feature values to generate a request to access and read a corresponding data value stored at a particular memory address location of memory 112. For example, the voice input 108 may be an utterance from user 106 that asks "where can I get a good pizza?" The feature extraction engine 118 can derive or generate feature values for words such as "where," "good," and "pizza." The feature extraction engine 118 can also generate a feature value for the location of the user 106, for example, using raw context data that is received with the voice input 108. The feature value may be for a location such as "San Francisco, Calif."

In some examples, the system 100 generates interleaved requests 110 to accelerate accessing and read data values stored at memory locations distributed across various banks and pages of memory 112. For example, interleaved requests 110 can be generated to accelerate retrieving data values for neural network inputs corresponding to "where," "good," and "pizza," as well as the location "San Francisco." The interleaved sub-requests 110 are generated at system 100 using a trans-unroller 120 that processes information specified by multiple individual requests to generate the interleaved requests 110. The trans-unroller 120 is described in more detail below with reference to FIG. 2 and FIG. 3.

The system 100 is configured to submit a request to lookup or retrieve data for an input value stored in a memory bank of memory 112. For example, a processor of a host device such as a high-level controller can submit a sequence of interleaved requests 110 to access a large lookup table of dictionary values stored at memory 112. The interleaved requests 110 can be submitted to retrieve (or read) data values for one or more terms in the lookup table that are stored across address locations of memory 112. The memory controller 114 processes the interleaved requests 110 to perform the table lookup and retrieve the data values from the address locations of memory 112.

The data values retrieved from memory 112 may be passed to the trans-unroller 120 in an interleaved format. The trans-unroller 120 is configured to re-order the data, for example, by un-interleaving the data before passing the data to the neural network model 102 or the device being used to implement the model 102. The re-ordered data passed to the neural network model 102 (or device) can represent inputs to be processed through one or more layers of the neural network model 102 to compute an inference. For example, in response to processing the inputs, the neural network model 102 can compute an inference that pertains to accurately recognizing the specific terms of the voice input 108 supplied by user 106.

Figure 2:
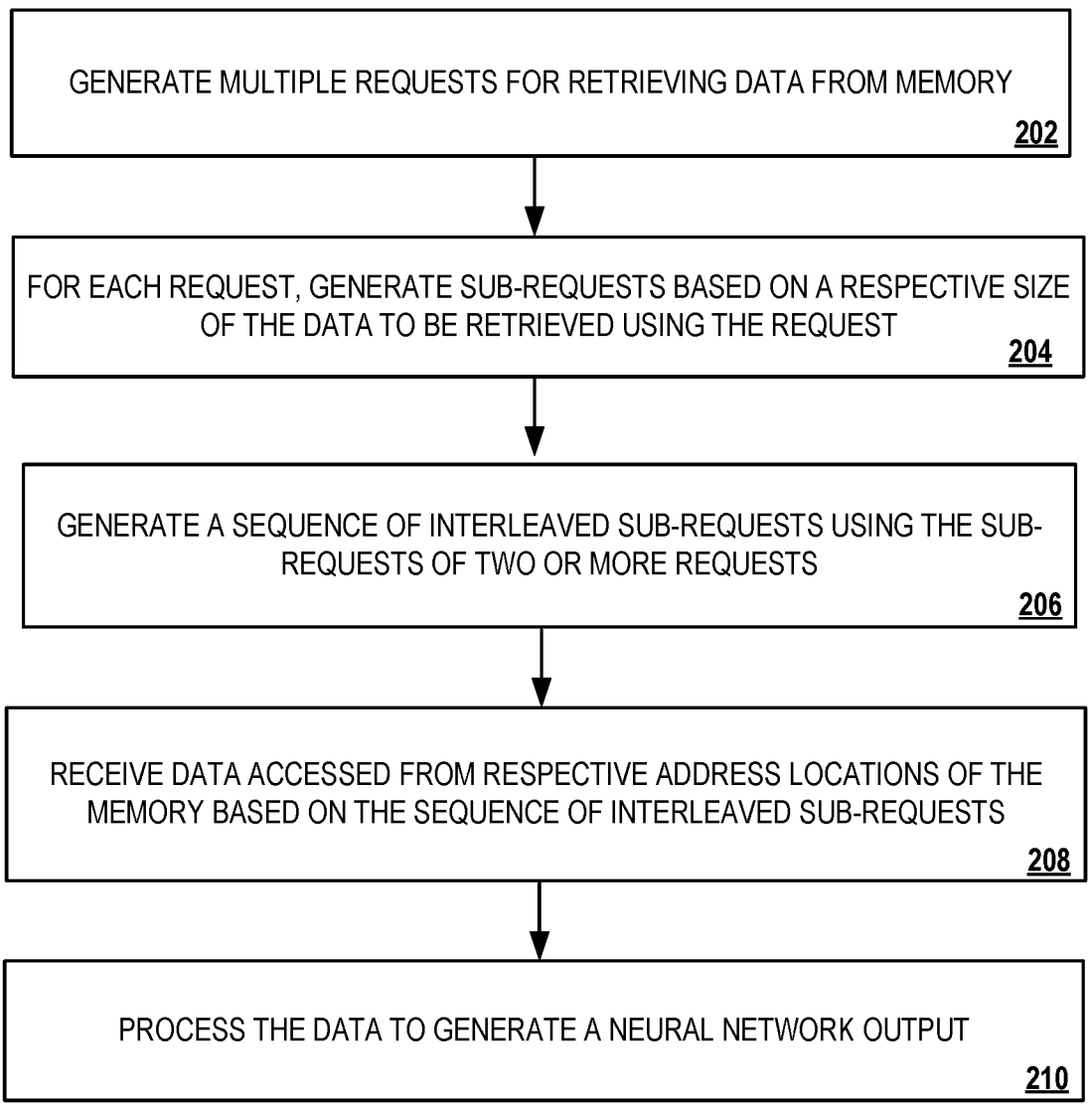
FIG. 2 is a flow diagram that illustrates an example process for interleaving memory requests to accelerate memory accesses.

FIG. 2 is a flow diagram that illustrates an example process 200 for interleaving memory requests to accelerate memory accesses. Process 200 can be implemented or executed using the system 100 described above. Descriptions of process 200 may reference the above-mentioned computing resources of system 100. The steps or actions of process 200 may be implemented using programmed firmware, or software instructions, that are executable by one or more processors of the devices and resources described in this document.

The steps of process 200 can correspond to a method for performing computations and generating a neural network output for a neural network using a system that includes high-bandwidth memory and a hardware circuit configured to implement the neural network. In some implementations, the process 200 is a sub-process of one or more other processes that are used for accelerating neural network computations using a hardware accelerator.

Referring now to process 200, the system 100 generates multiple requests (202). For example, the system 100 can include a host device or high-level controller that generates instructions and parameters for controlling or managing performance of an inference workload at system 100. The host device is operable to generate multiple requests that correspond to a portion of the instructions used to perform the workload. Each of the requests are used to retrieve data from a memory of system 100 and are executed to access individual address locations of the memory to retrieve (e.g., read) a corresponding data value. For example, each request is used to retrieve data values representing inputs to be processed through neural network layers of a neural network model.

For each individual request among the multiple requests, the system 100 generates multiple sub-requests based at least on a respective size of the data to be retrieved using the request (204). The system 100 can use the trans-unroller 120 to process information specified by a request (e.g., requirements or parameters of a request) and generate each of the sub-requests based on the information. For example, the request A described above can be generated by the host device as a 128B (e.g., 128 bytes) request. More specifically, the trans-unroller 120 is operable to determine that request A was issued by the host device to retrieve 128B of data.

In response to determining the respective size of the data to be retrieved using request A, the trans-unroller 120 generates two or more sub-requests based on that respective size. In the present example, the size of the data to be retrieved using request A is 128B and the trans-unroller 120 can be used to generate two 64B sub-requests or four 32B sub-requests. Alternatively, the trans-unroller 120 can generate eight 16B sub-requests. In some implementations, the trans-unroller 120 generates a particular quantity of sub-requests based on the minimum threshold data quantity that can be accessed from an individual address location of memory 112 during a given cycle.

Stated another way, the trans-unroller 120 is configured to generate one or more sub-requests based on: i) a size parameter of the request, ii) a threshold quantity of data that is accessible during a single memory cycle of memory controller 114, or iii) or both. As described in more detail below, the memory cycle is executed to access an address location of the memory 112 and corresponds to a clock cycle represented by a clock signal. In some implementations, the clock signal is generated by a processor of the memory controller 114. In other implementations, the clock signal is generated by a processor of the memory controller 114, is passed to the memory controller 114 by an external processor of the host device, is passed to the memory controller 114 by another component of the hardware circuit, or a combination of each.

The system 100 generates a sequence of interleaved sub-requests using the sub-requests of two or more requests (206). For example, the system 100 uses the trans-unroller 120 to generate a sequence of interleaved sub-requests that includes respective sub-requests of a first request (e.g., request A) interleaved among respective sub-requests of a second request (e.g., request B). In some implementations, the trans-unroller 120 can generate four 32B sub-requests for request A and generate four 32B sub-requests for request B. The four 32B sub-requests for request A can be identified as A0, A1, A2, and A3, whereas the four 32B sub-requests for request B can be identified as B0, B1, B2, and B3.

The trans-unroller 120 is configured to generate the sequence of interleaved sub-requests by interleaving the respective sub-requests A0, A1, A2, and A3 of request A with the respective sub-requests B0, B1, B2, and B3 of request B. The trans-unroller 120 can generate an example sequence of interleaved sub-requests, where the respective sub-requests of request A and request B are interleaved in the following sequence: A0, B0, A1, B1, A2, B2 and A3, B3. In some implementations, the trans-unroller 120 generates the sequence of interleaved sub-requests based on a respective transaction type of each request. A transaction type of a request can indicate whether the request is a read request, a write request, or some other attribute/parameter of the request.

In some examples the trans-unroller 120 is configured to identify the respective transaction type of two or more requests and interleave the respective sub-requests of each request only when the transaction type of a first request matches the transaction type of a second request. In these examples, using the trans-unroller 120 to generate the sequence of interleaved sub-requests includes: i) identifying a respective transaction type of a first request; ii) identifying a respective transaction type of a second, different request; and iii) causing the respective sub-requests of the first request to be interleaved among the respective sub-requests of the second request based on the respective transaction type of the first and second requests.

The trans-unroller 120 receives data accessed from the memory 112 based on the sequence of interleaved sub-requests (208). For example, the sequence of interleaved sub-requests are executed by memory controller 114 to retrieve the data values from memory 112 in accordance with parameters of each sub-request. In some implementations, a component of the trans-unroller 120 receives respective portions of data that were accessed from respective address locations of the memory based on the sequence of interleaved sub-requests.

For example, the memory controller 114 is configured to process the sequence of interleaved sub-requests to execute a respective operation defined by each sub-request. In response to the memory controller 114 processing the sequence of interleaved sub-requests, a reorder buffer (described below) included in trans-unroller 120 receives respective portions of data (e.g., neural network inputs) accessed from the different address locations of the memory 112.

The system 100 processes the data to generate a neural network output (210). For example, the system 100 processes each of the respective portions of data to generate a neural network output corresponding to a prediction or inference 103. More specifically, the system 100 processes each of the respective portions of data using the neural network model 102 implemented at the hardware circuit. The respective portions of data can correspond to neural network inputs that are processed through neural network layers of the model to generate the inference 103. For example, the inference 103 can pertain to accurately recognizing specific terms of a voice input 108 or objects in an image.

In general, a neural network having multiple layers can be used to compute inferences. For example, given an input, the neural network can compute an inference for the input. The neural network computes this inference by processing the input through each of the layers of the neural network. In some implementations, the layers of the neural network are arranged in a sequence, each with a respective set of weights. Each layer receives an input and processes the input in accordance with the set of weights for the layer to generate an output.

Therefore, in order to compute an inference from a received input, the neural network receives the input and processes it through each of the neural network layers in the sequence to generate the inference. In some cases, the output from one neural network layer is provided as input to the next neural network layer. Data inputs to a neural network layer, e.g., either the input to the neural network or the outputs of a first layer that precedes a second layer in the sequence, can be referred to as activation inputs to that neural network layer.

In some implementations, the layers of the neural network are arranged in a directed graph. That is, any particular layer can receive multiple inputs, multiple outputs, or both. The layers of the neural network can also be arranged such that an output of a layer can be sent back as an input to a previous layer.

Figure 3:
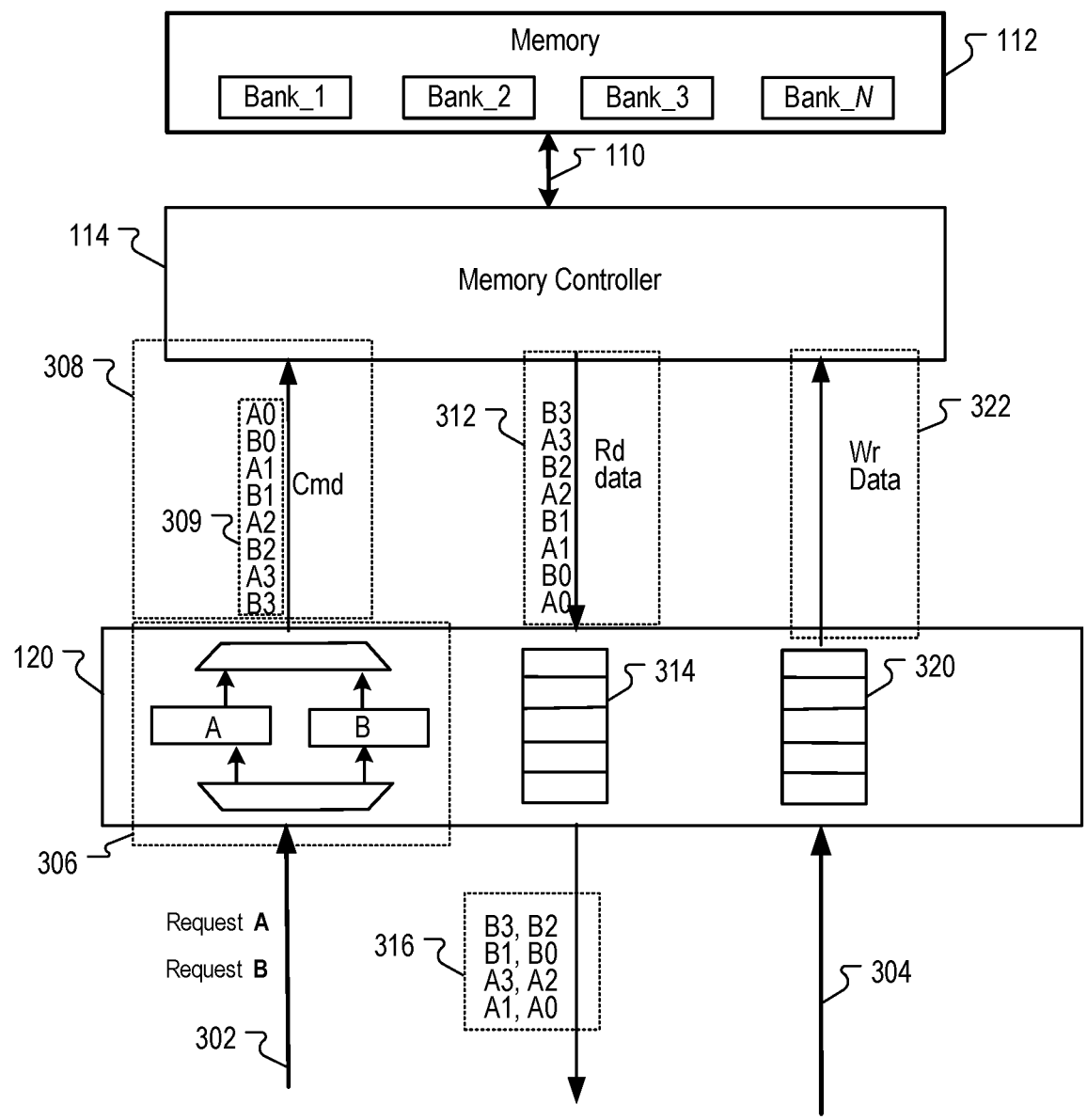
FIG. 3 is a block diagram showing example components of a computing system that are used for interleaving memory requests.

FIG. 3 is a block diagram showing example components of system 100 that are used for interleaving two or more memory requests. In the example of FIG. 3, the trans-unroller 120 receives one or more read requests 302. For example, the trans-unroller 120 receives one or more read requests 302 that can include request A and request B, as described above with reference to FIG. 2. The trans-unroller 120 also receives one or more write requests 304. The write requests 304 are addressed briefly below.

The trans-unroller 120 includes a request interleave module 306 that is configured to process information specified by multiple individual requests 302. The request interleave module 306 is configured to generate an interleaved command sequence 308 that includes the sequence of interleaved sub-requests 309. More specifically, the request interleave module 306 is configured to generate the sequence of interleaved sub-requests 309 in response to processing information such as respective requirements or parameters specified by each individual request 302. In some implementations, the request interleave module 306 is implemented in software, in hardware, or both. The processing of each request 302 to generate to the sequence of interleaved sub-requests 309 using the request interleave module 306 is described in more detail below.

An example request 302 generated at system 100 can be a 512B read request. As indicated above, this 512B request can be sub-divided or split into four 128B sub-requests. In some implementations, the request interleave module 306 causes each 128B sub-request to be delivered to a different quadrant of memory 112 based on a command sent to the memory controller 114 (described below). The memory 112 can include multiple channels and each channel can be configured to handle 128B of data along with a command bit. In general, a channel can represent a data connection between memory 112 and memory controller 114 that provides a particular data transfer rate or bandwidth for routing data values during an example read operation or an example write operation.

The channel can be split into two pseudo-channels and each pseudo-channel can be used to perform a particular operation, such as a read operation to retrieve a data value stored at a particular address location of memory 112 or a write operation to write (or store) a data value at a particular address location of memory 112. In some implementations, each of the 128B sub-requests discussed earlier is delivered to a particular pseudo-channel of the memory 112. In some examples, read requests 302 or write requests to the memory 112 can have a 32B payload. In these examples, each 128B request is sub-divided or split into four individual requests or sub-requests.

For at least two such requests, the trans-unroller 120 is configured to interleave the sub-divided portions (e.g., sub-requests) of the two requests. For example, the trans-unroller 120 is configured to generate a sequence of interleaved sub-requests 309 by interleaving the sub-divided portions of these two requests. Referring to the example of FIG. 3, these two sub-requests can be represented by request A and request B. The trans-unroller 120 uses the request interleave module 306 to generate the sequence of interleaved sub-requests 309 that includes respective sub-requests (32B each) of request A interleaved among respective sub-requests (32B each) of request B.

As noted above, the request interleave module 306 is configured to generate the sequence of interleaved sub-requests 309 in response to processing the respective information specified by each of the multiple individual requests 302. For example, the request interleave module 306 generates the sequence of interleaved sub-requests 309 in accordance with parameters of each sub-request. The parameters can include a size parameter that specifies a size of the data to be retrieved using the request. The parameters can indicate an address for a location in memory that stores a particular data value to be read. The parameters can also indicate a bank assignment of the request, such as the particular memory bank (e.g., bank 0, bank_1, bank_3, or bank_N) or quadrant of memory 112 to which the request is to be assigned.

In some implementations, the request interleave module 306 generates the sequence of interleaved sub-requests 309 based on a respective bank assignment of a first request and a respective bank assignment of a second request. More specifically, the request interleave module 306 can generate the sequence of interleaved sub-requests 309 based on a hashing of addresses (described below) in two or more requests 302 to cause each sub-request to be routed to a particular memory bank of memory 112. For example, the request interleave module 306 is configured to determine a bank assignment of a request 302 based on the hash value of an address in the request. The bank assignment indicates a memory bank (e.g., bank_1, bank_8, or bank_N) of the memory 112 that includes the particular memory location address to be accessed when the memory controller 114 processes the request 302 to retrieve data from memory 112.

For each request 302 of the multiple requests 302, the request interleave module 306 is configured to generate one or more hash values for the request 302 to cause the request 302, including its respective sub-requests, to be routed to a particular memory bank or quadrant of memory 112. In some implementations, the request interleave module 306 implements an example hashing algorithm for hashing memory location addresses specified in a request 302. For example, the memory location addresses may be specified by address bits that identify at least one address location in the memory 112 that stores a portion of the data to be retrieved using the request 302. The request interleave module 306 uses the hashing algorithm to generate a hashed value for an address of a memory location based on the address bits in the request 302.

The trans-unroller 120 is configured to route the sub-requests of an interleaved sequence 309 in accordance with a particular control scheme. In some implementations, the control scheme specifies a routing of the sub-requests based on a variety of parameters. For example, the control scheme can specify that each sub-request in a sequence of interleaved sub-requests 309 must be routed to a different bank group of memory 112. As explained below, the control scheme is configured to address or mitigate one or more sources of inefficiency that cause bandwidth loss in an example memory controller 114 or certain degraded functionality of memory 112.

Referring briefly to memory 112, as described above, memory 112 can include N number of memory banks, where N is an integer greater than or equal to one. In some implementations, memory 112 is a high-bandwidth, high-speed DRAM memory that includes 16 memory banks or 32 memory banks. A set of 4 memory banks can form a bank group. For example, bank_0 to bank_3 can be a first bank group, bank_4 to bank_7 can be a second bank group, bank_8 to bank_11 can be a third bank group, and bank_12 to bank_15 can be a fourth bank group. Similar arrangements of bank groups may be formed for banks 16 to 32 for a memory 112 that includes 32 memory banks.

Some sources of bandwidth loss in a memory controller or memory 112 can include: i) inactivity due to electrical settling time (e.g., to quiesce or pause the data bus) that is required when read data and write data share a common data bus; ii) inactivity due to bank refresh time; iii) inactivity due to "bubbles" or idle cycles (e.g., one cycle) that are required for read data that switches between a particular set of banks (e.g., banks 0 . . . 15 and banks 16 . . . 31); iv) inactivity due to required idle cycle to separate back-to-back requests to the same bank (or bank group); and v) degraded memory functions due to address striding that causes hot spotting on certain memory banks or pseudo channels of memory 112.

In general, periods of inactivity due to the required insertion of one or more bubbles or idle cycles and bank refreshes account for main sources of processing inefficiency for accessing memory 112. In some cases, a constraint or restriction related to accessing banks within a bank group and banks across bank groups correspond to one or more of sources of inefficiency described above. The trans-unroller 120 is configured to determine a control scheme with reference to one or more access constraints that can trigger periods of inactivity due to, for example, a required idle cycle or bank refresh.

For example, because back-to-back read requests to memory banks in same bank group require insertion of an idle cycle between each request (or sub-request), the trans-unroller 120 is configured to determine a control scheme that causes at least two consecutive requests to either be routed to different bank groups or routed in some other manner that mitigates occurrence of an idle cycle or other period of inactivity. For example, the control scheme can specify that each sub-request in a sequence of interleaved sub-requests 309 must be routed to a different bank group of memory 112.

Referring again to requests A and B, for each of these requests, the trans-unroller 120 can determine a mapping of address locations across memory 112 based on the various address bits specified in each of the requests. The mapping of address locations can indicate the various banks and bank groups that will be accessed to retrieve the individual data values specified in the two requests. The trans-unroller 120 generates certain hashed values to cause a given sub-request to be routed in accordance with the requirements of a particular control scheme. For example, the trans-unroller 120 generates the hashed values to cause each sub-request in a sequence of interleaved sub-requests 309 to be routed to a different bank group of memory 112.

In some implementations, the trans-unroller 120 references a respective hashed value for each sub-request to identify at least two respective sub-requests of request A and request B that are assigned to different bank groups. The two sub-requests are interleaved to ensure that there are no bubbles or idle cycles between sub-requests. For example, if request A and request B are two 128B requests to two different bank groups, the request interleave module 306 interleaves respective 32B sub-requests of requests A and B as A0, B0, A1, B1, A2, B2, A3, B3, Ai, Bi, where Ai and Bi are the ith 32B chunks of the requests. In some implementations, this control scheme of mapping A0 and A1 to two different banks doubles the ratio of bank opens to read/writes to 1:2, instead of a less efficient ratio such as 1:4.

The trans-unroller 120 includes one or more predefined control schemes that can be used to prevent or mitigate inefficiencies that can result from one or more of the sources discussed above. At least one predefined control scheme can be based on a memory architecture of memory 112. For example, the trans-unroller 120 can include an example stack identification (ID) control scheme (e.g., a predefined control scheme). As noted above, one source of inefficiency in memory 112 is the requirement of an idle cycle when issuing a read request to bank_0 . . . 15 that is followed by a read request to bank_16 . . . 31 or vice versa. In some cases, this overhead requirement of an idle cycle does not exist for write requests. The stack ID control scheme is configured to reduce or mitigate the effect of this inefficiency. For example, the stack ID control scheme can be used to reduce the periods of inactivity that occur when idle cycles are required for read data that switches bank partitions of memory 112.

For example, the trans-unroller 120 uses the stack ID control scheme to schedule multiple read requests to a lower 16 memory banks (e.g., bank_0-bank_15) before switching to an upper 16 memory banks (e.g., bank_16-bank_32) and vice versa. Using the stack ID control scheme, the trans-unroller 120 is operable to identify a partitioning of memory banks, e.g., an upper bank partition or a lower bank partition, based on a memory architecture of memory 112. The trans-unroller 120 uses the stack ID control scheme to maximize the total number of read requests that can be issued to a first partition of banks before switching to a second, different partition of banks.

In some implementations, maximizing the total number of read requests to a given partition of banks can cause a corresponding increase in latency. The trans-unroller 120 can use the stack ID control scheme to determine a threshold number of read requests to be issued to a first partition of banks before switching to a second, different partition of banks. The threshold number of read requests is determined to achieve a desired balance between the reduced inefficiency from idle cycles and the added latency from increasing the number of read requests.

Each bank of memory 112 can be divided into pages or rows. A row or page can include an address location that must be accessed when the memory controller 114 processes a read request. The memory controller 114 can perform a function of "opening" and "closing" a page (or row) when a request to access a particular address location at the page is processed. In some examples, the memory controller 114 can queue up to 12 requests of 32B each. However, the queue of up to 12 request does not provide sufficient buffer to cover the time required to close and open a page of a memory bank. In view of this, the trans-unroller 120 is configured to implement a closed page policy. For example, after each 128B request, the page is closed and the trans-unroller 120 spaces out subsequent requests to the same bank. Based on the closed page policy the memory controller 114 is only required to cover the delay involved in opening a page.

The trans-unroller 120 includes a command parking control scheme that is used to reduce or mitigate inactivity due to electrical settling time that is required on a common data bus that is used for read requests 302 and write requests 304. More specifically, when the data routed along a common bus changes directions, such as a transition from a read request to a write request or from a write request to a read request, the bus is required to be quiesced. The requirement to quiesce the common bus corresponds to a gap for electrical settling or period of inactivity between the transitions. In some implementations, a pair of requests for a read to write transition or for a write to read transition can require (or consume) about 32 nanoseconds (ns).

The example 32 ns is a bus turnaround penalty that represents a period of inactivity due to electrical settling to ensure residual data from a first request does not distort data for a second request. To avoid the bus turnaround penalty associated with read to write (RW) and write to read (WR) transitions, the trans-unroller 120 is configured to send multiple read or multiple write commands before it switches to the other command/request type. The command parking control scheme amortizes the RW and WR turnaround over multiple transactions. For example, based on the command parking control scheme, the trans-unroller 120 can determine a grouping of read command types or write command types to maximize the amount of reads or writes that can be sent before turnaround (or transition) triggers the bus turnaround penalty. In some implementations, increasing or maximizing the number of read (or write) commands that are sent before switching to writes (or reads) can reduce the turnaround overhead, but it can also cause a corresponding increase in latency.

The memory controller 114 is operable to execute the interleaved command sequence 308 to process each of the interleaved sub-requests in the sequence of interleaved sub-requests 309. In the example of FIG. 3, read data 312 represents the individual data values that are retrieved in response to processing each of the interleaved sub-requests. The individual data values of read data 312 are routed to a reorder buffer 314 of trans-unroller 120 for further processing to generate a set of un-interleaved data values 316, as described below with reference to FIG. 4.

The write requests 304 are routed to a reorder buffer 320 and a corresponding write command 322 is generated for routing to memory controller 114 to cause the data values specified by the write command 322 to be stored to memory 112. In some implementations, example read commands or requests 302 are processed at system 100 to route data such as weights and inputs from a high-bandwidth memory (e.g., memory 112) of system 100 to a special-purpose processor, such as a neural network processor, an application specific integrated circuit (ASIC), or a hardware accelerator. In other implementations, example write commands 322 are processed at system 100 to route data such as activation values or neural network outputs from a memory of the special-purpose processor to the high-bandwidth memory of system 100. The data may be routed along the same wires for each of the read command 302 and the write command 304.

While the reordering data processes of trans-unroller 120 can provide increases in bandwidth, they can also reduce average latency for a certain bandwidth. For example, one or more of the reordering control schemes described above (e.g., stack ID and command parking) can cause corresponding increases in latency. In view of this, the trans-unroller 120 can include a reorder block that implements techniques for latency reduction.

For example, the reorder block can implement an early write completion technique where signals that indicate completions for incoming writes 304 are sent as soon as the writes 304 are committed to a write buffer 320, rather than when the writes are stored in an address location at a particular bank of memory 112. These particular writes 304 to store data at the system memory can then be drained to the memory 112 at a later time in a more optimum bank order. This early write completion technique can be implemented to keep the write completion latency below a particular threshold latency. In some implementations, the early write completion technique is configured to ensure global observability of a write transaction 304 for which an early completion signal has been sent. For example, any subsequent read requests 302 that conflicts with pending writes 304 in the write buffer 320 causes the read queue to stall until all pending writes 304 drain to the memory 112.

The reorder block of trans-unroller 120 is also configured to implement a latency reduction technique that involves bank hotspotting prioritization. This latency reduction technique is described in more detail below with reference to FIG. 5.

Figure 4:
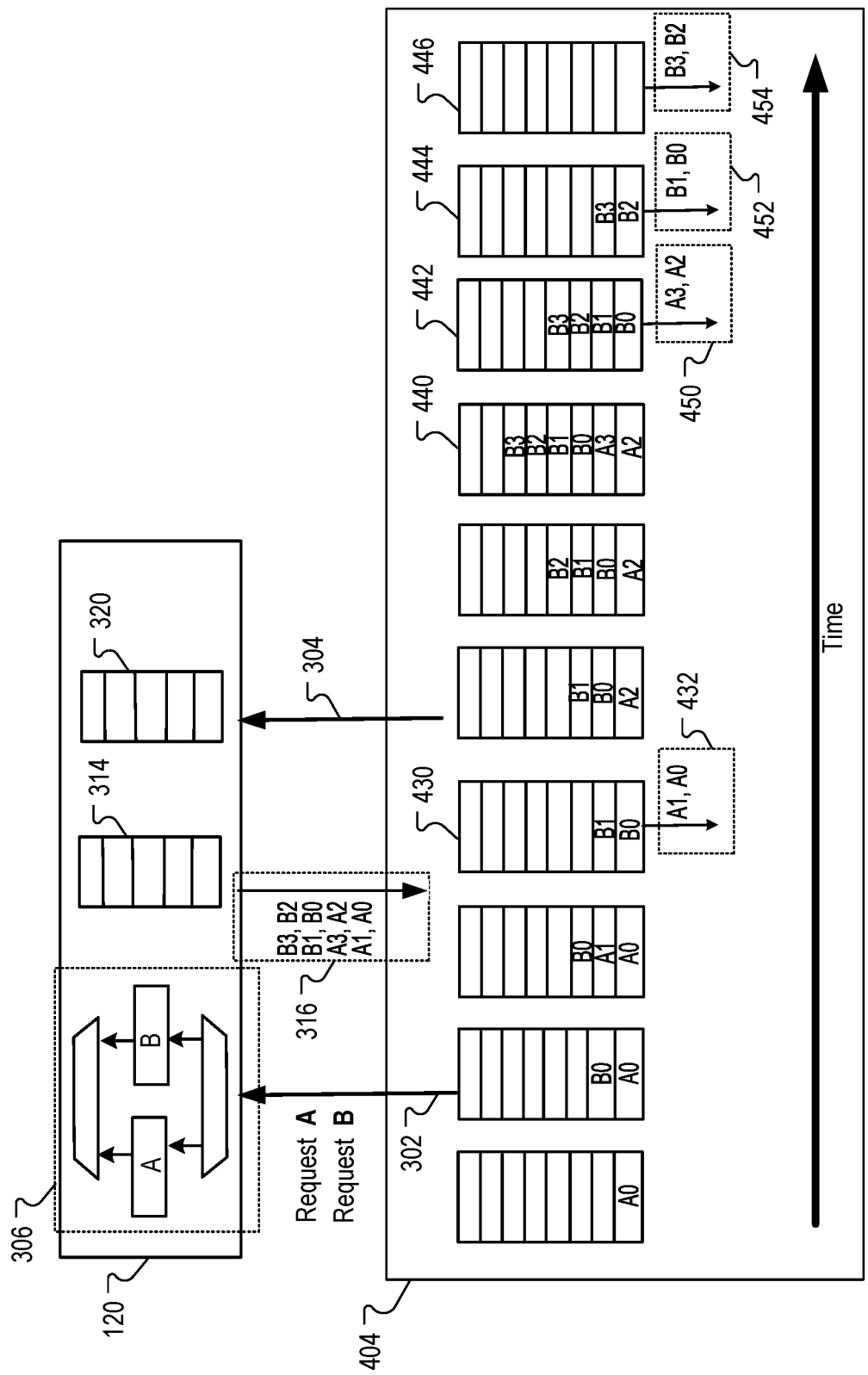
FIG. 4 is a block diagram showing an example reorder buffer for reordering data obtained using an interleaved memory request.

FIG. 4 is a block diagram showing an example reorder buffer 314 for reordering data obtained using an interleaved memory request. For example, the memory controller 114 is configured to process the sequence of interleaved sub-requests 309 to execute a respective operation defined by each sub-request in the sequence. In response to the memory controller 114 processing the sequence of interleaved sub-requests 309, a reorder buffer 314 included in trans-unroller 120 receives respective portions of data (e.g., neural network inputs) accessed from the different address locations of the memory 112. The respective portions of data are represented by the individual data values of read data 312.

As shown in the example of FIG. 3 described above, the read data 312 is retrieved from the address locations in the respective memory banks of memory 112 in accordance with an order defined by the interleaved command sequence 308. For example, because the memory controller 114 returns data back in the same interleaved order in which the command was sent, the individual data values read from memory 112 flow back to the trans-unroller 120 in an order sequence that matches the ordering of the sub-requests in the sequence of interleaved sub-requests 309. Hence, the data values of read data 312 are passed to the trans-unroller 120 in an interleaved format. The read data 312 is routed to trans-unroller 120 for further processing to un-interleave the data values.

The reorder buffer 314 of trans-unroller 120 is configured to re-order the data values of read data 312, for example, by un-interleaving the data before passing the data to the neural network 120. The reorder buffer 314 re-orders the data values of read data 312 to generate a set of un-interleaved data 316. For example, the reorder buffer 314 un-interleaves the read data 312 to convert the data back to its prior compatible format for sending to the requesting source.

The reorder buffer 314 implements a queue that it uses to store data from each of the interleaved channels together. The queue can be managed based on a first-in-first-out (FIFO) logic. For example, the reorder buffer 314 includes a FIFO control logic that is operable to store a location where a previous data from a particular channel was written. If a new data from that channel is received and the new data is not the first data response for that request, the FIFO control logic causes the reorder buffer 314 to add the new data to the memorized location and moves all later data to higher locations. If a new data from that channel is received with the first data response for a new request, that data is added to the end of the FIFO control.

In some implementations, if trans-unroller 120 is not in the midst of sending data for a request 302, the trans-unroller 120 forwards 64B of data until trans-unroller 120 arrives at the end of a packet that is being forward. The trans-unroller 120 will forward the 64B of data so long as that amount of data is available from a specific channel at the head of the FIFO control. If the trans-unroller 120 is in the midst of sending data for a request 302, the trans-unroller 120 forwards 64B of data so long as that amount of data is available from the ongoing channel at the head of the FIFO control.

In the example of FIG. 4, block 404 shows different buffer states of reorder buffer 314. An example time axis that progresses from left to right shows the different states of reorder buffer 314 as the memory controller 114 processes each sub-request in the sequence of interleaved sub-requests 309. As shown at FIG. 4, the reorder buffer 314 receives a respective data value (e.g., represented by Ai or Bi) for a sub-request based on the ordering of the sub-requests in the sequence of interleaved sub-requests 309. For example, the reorder buffer 314 receives example data value A0, then B0, then A1, then B1, and so on.

The different buffer states 430, 440, 442, 444, and 446 shows how the queue of the reorder buffer 314 that stores data from each of the interleaved channels dynamically changes as data values are received, un-interleaved, and then drained. For example, the reorder buffer 314 is configured to automatically drain un-interleaved data values that represent data retrieved for a single request 302. The reorder buffer 314 is also configured to reorder and un-interleave the interleaved data in real-time. In some implementations, data values A1, A0 (432) represent un-interleaved data for a single request 302 from a particular source and may be a compatible format for sending to the requesting source. Similarly, each of A3, A2 (450), B1, B0 (452), and B3, B2 (454) represents un-interleaved data for a single request 302 from a particular source and may be a compatible format for sending to the requesting source.

The system 100 passes the set of un-interleaved data 316 to a hardware accelerator of the system that implements the neural network model 102 described above. In some implementations, the set of un-interleaved data 316 represents a set of inputs (or weights) to be processed through one or more layers of the neural network model 102 to compute an inference. For example, in response to processing the inputs, the neural network model 102 can compute an inference that pertains to accurately recognizing the specific terms of the voice input 108 supplied by user 106.

Figure 5:
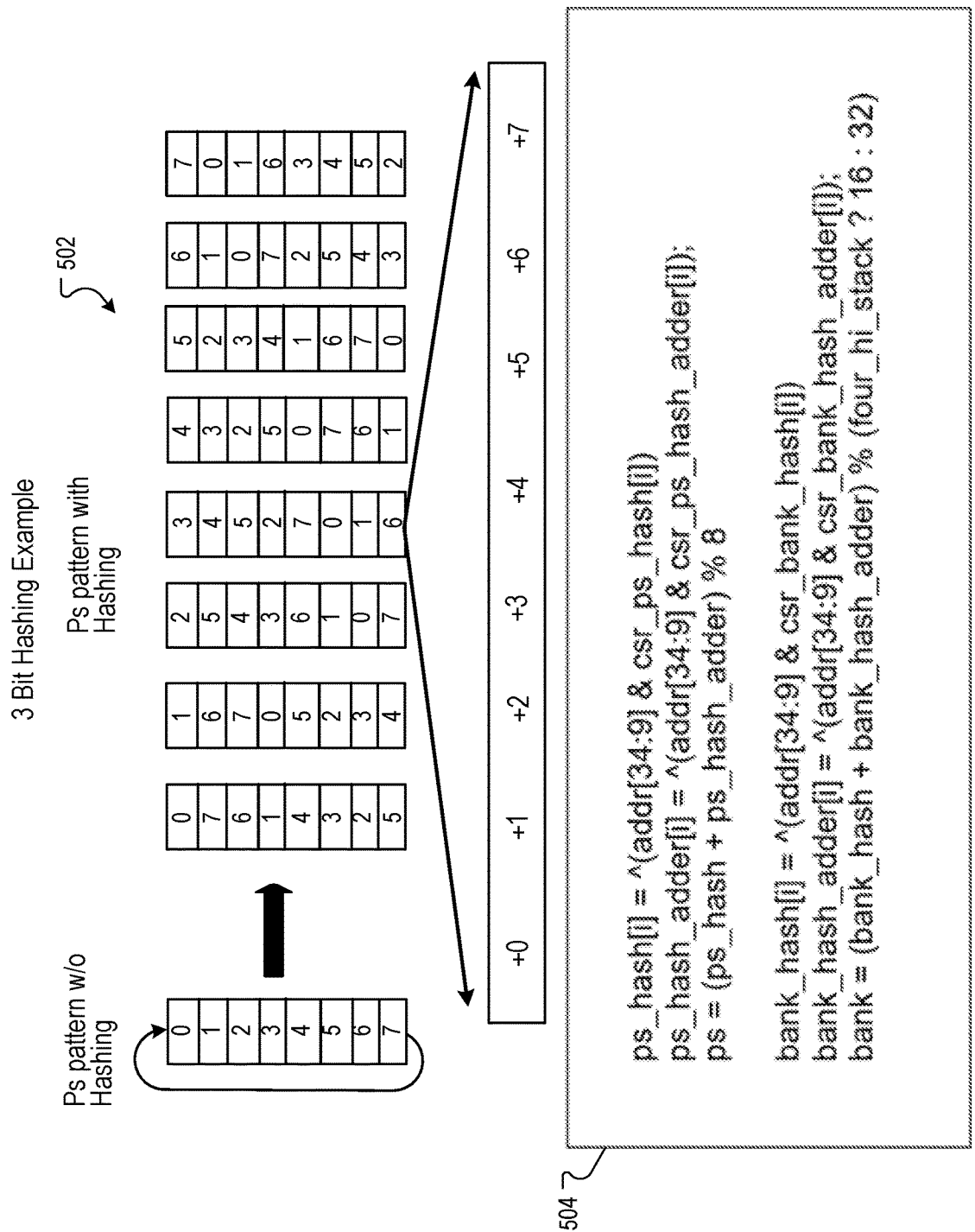
FIG. 5 is a block diagram that illustrates an example hashing algorithm for hashing addresses for memory locations identified in a request.

FIG. 5 is a block diagram that a illustrates 3-bit hashing example 502 and an example hashing algorithm 504 for hashing addresses for memory locations identified in a request.

As discussed above, the trans-unroller 120 can implement an example hashing algorithm 504 for hashing addresses specified in a request 302. For example, the request interleave module 306 of trans-unroller 120 uses the hashing algorithm 504 to generate a hashed value for an address of a memory location based on the address bits in the request 302. The trans-unroller 120 performs address hashing to mitigate degraded performance of memory 112 that can occur in response to hot spotting.

Incoming transactions (e.g., requests 302 or writes 304) are required to be mapped to a specific pseudo-channel, memory bank, row, and column. These elements of a transaction can be represented as fields. In some implementations, if these fields are mapped to specific address bits, then strided accesses can hot spot on pseudo channels/banks. For example, if address[12:10] were the pseudo channel bits, then a stride of 8 KB will hot spot on a specific pseudo-channel resulting in performance degradation.

To reduce a likelihood of experiencing this performance degradation, the trans-unroller 120 implements a hashing scheme, with reference to memory 112, to generate banks and channels for routing requests 302. The hashing algorithm 504 can be used to calculate each hashed bit by Xoring selected address bits of a request 302. Further, the hashing algorithm 504 is structured to address some pathological striding patterns that can cause certain temporal hot spotting that occurs when a continuous sequence of about 200 addresses are mapped to the same value. To reduce this probability, the hashing algorithm 504 generates an adder term using a different hash pattern, which further reduces the probability of hot spotting.

As mentioned above, the reorder block of trans-unroller 120 is configured to implement a latency reduction technique that involves bank hotspotting prioritization. For example, even with the hashing algorithm 504, it is possible to have a number of transactions that are routed to the same bank. This can also be the case when a refresh transaction is blocking a specified bank for a prolonged period of time. In conjunction with a closed page policy as described above, if a number of outstanding transactions to any given memory bank exceeds a specified threshold, these transactions get higher priority. This further reduces the probability of bank hotspotting.

FIG. 6 is a block diagram that illustrates an example implementation of a hashing scheme. In the example of FIG. 6 a software process run at system 100 is operable to issue addresses that are each 35 bits wide for a capacity of memory 112, or unit of the memory, that is 32 gigabytes (GB). The software process can also issue addresses using fewer than 35 bits or more than 35 bits. For example, the software can issue addresses that are each N-bits wide, where N is an integer. The 32 GB capacity may be provided by a unit of memory 112 that includes multiple memory banks. As noted above, each 35-bit address identifies a respective memory location in the unit or a memory bank of the unit.

Among the 35 bits for a given address, a certain number of bits may be identified as "bank bits." For example, four bits in a 35-bit address may be used as bank bits. The bank bits are used to determine a bank assignment for routing the request. The system 100 is configured to determine or select which bits in a 35-bit address are the bank bits. In some implementations, the request interleave module 306 implements an example algorithm that maps specific bits to be the bank bits. For example, the algorithm can be "bank[3:0] =address[12, 11, 10, 9]," where bits positions 12, 11, 10, and 9 in the 35-bit address are used as the four bank bits.

When processing requests, the system 100 may access addresses for a request (or set of requests) using strided pattern. The stride pattern may be implemented using incremental jumps of 8 kilobytes (KB). For example, the stride pattern may be implemented as 0, 8K, 16K, 24K, 32K, 40K, 48K and so on. Based on this stride pattern and the example algorithm above for mapping bits to be bank bits, the bank results for addresses computed at system 100 will correspond to address bits[12:0]=0. This means that the addresses computed for this stride pattern will have a mapping of bank=0, resulting in bank_0 of the memory unit being a bottleneck that can degrade performance of the memory system. More specifically, the bottleneck can lead to degraded memory functions due to address striding that causes hot spotting on certain memory banks or pseudo channels of memory 112, as described above with reference to FIG. 3.

To address this bottleneck concern, the system 100 is configured to implement an example hashing scheme 602. For example, as described above, the hashing algorithm 504 can be used to calculate each hashed bit by Xoring selected address bits of a request 302. The hashing scheme 602 illustrates a hashing implementation that uses a bitwise_xor function that returns a 1 if an input has an odd number of bit value "1" in its binary representation and 0 if the input has an even number of "1s" in its binary representation. Based on this scheme, the address-to-bank mapping for the above mentioned strided pattern example would be as shown at mapping table 604. In some implementations, the values of {0x1111111, 0x2222222, . . . etc} that are shown for the hashing scheme 602 are examples only and various other exemplary values may be used.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus.

Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "computing system" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. Some elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for generating a neural network output for a neural network using a system comprising memory and a hardware circuit configured to implement the neural network, the method comprising:

generating multiple requests, each request being used to retrieve data from the memory, wherein the memory includes a high-bandwidth memory, the high-bandwidth memory including one or more memory bank groups, each of the one or more memory bank groups including a plurality of memory banks;

for each request of the multiple requests to retrieve data from the memory:
generating a plurality of sub-requests based on a respective size of the data to be retrieved using the request;

generating a sequence of interleaved sub-requests that includes respective sub-requests of a first request to retrieve data from a first memory bank group interleaved among respective sub-requests of a second request to retrieve data from a second memory bank group that is different from the first memory bank group; wherein the sequence of interleaved sub-requests are generated to mitigate idle cycles of the memory by avoiding any two consecutive sub-requests in the sequence of interleaved sub-requests being routed to a same memory bank group, wherein generating the sequence of interleaved sub-requests comprises:
determining that a first sub-request in the sequence is a sub-request of the first request to retrieve data from the first memory bank group; and
in response, selecting, as a second sub-request that follows the first sub-request in the sequence, a sub-request from the second request to retrieve data from the second memory bank group different from the first memory bank group;

receiving, based on the sequence of interleaved sub-requests, interleaved response data comprising portions of data responsive to each of the multiple requests interleaved with one another;

generating, for each request, respective response data that includes only the portions of the interleaved response data that are associated with the request; and processing, using the neural network implemented on the hardware circuit, the respective response data to generate the neural network output.

2. The method of claim 1, wherein the hardware circuit comprises a reorder buffer and wherein generating the respective response data comprises:
receiving, by the reorder buffer, the interleaved response data, wherein the portions of data responsive to each of the multiple requests are interleaved in an order that coincides with the sequence of interleaved sub-requests; and reordering, by the reorder buffer, the interleaved response data to generate the respective response data each only including portions of data responsive to the corresponding request.

3. The method of claim 2, wherein the received interleaved response data is stored in a queue of the reorder buffer, the queue being managed based on first-in-first-out logic; and wherein each portion of data of the received interleaved response data is moved to a respective location in the queue according to the corresponding request.

4. The method of claim 1, comprising, for each request of the multiple requests:

generating a hash value for the request based on address bits in the request that identify at least one address location in the memory that stores a portion of the data to be retrieved using the request.

5. The method of claim 4, comprising:

determining a bank assignment of the request based on the hash value for the request, wherein the bank assignment includes an indication of a memory bank group of the memory to be accessed when the system processes the request to retrieve data from the memory.

6. The method of claim 1, wherein generating the sequence of interleaved sub-requests comprises:

identifying a respective transaction type of the first request;

identifying a respective transaction type of the second request; and causing the respective sub-requests of the first request to be interleaved among the respective sub-requests of the second request based on the respective transaction type of the first and second requests.

7. The method of claim 1, wherein generating the plurality of sub-requests using the request comprises:

generating the plurality of sub-requests based on a threshold quantity of data that is accessible during a single memory cycle that is executed to access an address location of the memory.

8. The method of claim 7, wherein generating the plurality of sub-requests comprises:

parsing the request based on the respective size of the data to be retrieved and a threshold quantity of data that is accessible from the single memory cycle;

in response to parsing the request, forming respective portions of the request; and generating the plurality of sub-requests using each of the respective portions of the request.

9. The method of claim 8, wherein each of the respective portions of the request corresponds to the threshold quantity of data that is accessible from the single memory cycle.

10. A system for performing computations to generate an output for a layer of a neural network comprising a plurality of neural network layers using memory of the system and a hardware circuit configured to implement the neural network, the system comprising:

one or more processing devices;

one or more non-transitory machine-readable storage devices for storing instructions that are executable by the one or more processing devices to cause performance of operations comprising:

generating multiple requests, each request being used to retrieve data from the memory, wherein the memory includes a high-bandwidth memory, the high-bandwidth memory including one or more memory bank groups, each of the one or more memory bank groups including a plurality of memory banks;

for each request of the multiple requests to retrieve data from the memory:

generating a plurality of sub-requests based on a respective size of the data to be retrieved using the request;

generating a sequence of interleaved sub-requests that includes respective sub-requests of a first request to retrieve data from a first memory bank group interleaved among respective sub-requests of a second request to retrieve data from a second memory bank group; wherein the sequence of interleaved sub-requests are generated to mitigate idle cycles of the memory by avoiding any two consecutive sub-requests in the sequence of interleaved sub-requests being routed to a same memory bank group, wherein generating the sequence of interleaved sub-requests comprises:

determining that a first sub-request in the sequence is a sub-request of the first request to retrieve data from the first memory bank group; and in response, selecting, as a second sub-request that follows the first sub-request in the sequence, a sub-request from the second request to retrieve data from the second memory bank group different from the first memory bank group;

receiving, based on the sequence of interleaved sub-requests, interleaved response data comprising portions of data responsive to each of the multiple requests interleaved with one another;

generating, for each request, respective response data that includes only the portions of the interleaved response data that are associated with the request; and processing, using the neural network implemented on the hardware circuit, the respective response data to generate the output of the layer.

11. The system of claim 10, wherein the hardware circuit comprises a reorder buffer and wherein generating the respective response data comprises:

receiving, by the reorder buffer, the interleaved response data, wherein the portions of data responsive to each of the multiple requests are interleaved in an order that coincides with the sequence of interleaved sub-requests; and reordering, by the reorder buffer, the interleaved response data to generate the respective response data each only including portions of data responsive to the corresponding request.

12. The system of claim 11, wherein the received interleaved response data is stored in a queue of the reorder buffer, the queue being managed based on first-in-first-out logic; and wherein each portion of data of the received interleaved response data is moved to a respective location in the queue according to the corresponding request.

13. The system of claim 10, wherein the operations comprise, for each request of the multiple requests:

generating a hash value for the request based on address bits in the request that identify at least one address location in the memory that stores a portion of the data to be retrieved using the request.

14. The system of claim 13, wherein the operations comprise:
- determining a bank assignment of the request based on the hash value for the request,
- wherein the bank assignment includes an indication of a memory bank group of the memory to be accessed when the system processes the request to retrieve data from the memory.

15. The system of claim 10, wherein generating the sequence of interleaved sub-requests comprises:
- identifying a respective transaction type of the first request;
- identifying a respective transaction type of the second request; and
- causing the respective sub-requests of the first request to be interleaved among the respective sub-requests of the second request based on the respective transaction type of the first and second requests.

16. The system of claim 10, wherein generating the plurality of sub-requests using the request comprises:
- generating the plurality of sub-requests based on a threshold quantity of data that is accessible during a single memory cycle that is executed to access an address location of the memory.

17. The system of claim 16, wherein generating the plurality of sub-requests comprises:
- parsing the request based on the respective size of the data to be retrieved and a threshold quantity of data that is accessible from the single memory cycle;
- in response to parsing the request, forming respective portions of the request; and
- generating the plurality of sub-requests using each of the respective portions of the request.

18. A non-transitory machine-readable storage device for storing instructions that are executable by a processing device to implement a neural network having multiple neural network layers on a hardware circuit used to perform neural network computations and to cause performance of operations comprising:
- generating multiple requests, each request being used to retrieve data from a memory, wherein the memory includes a high-bandwidth memory, the high-bandwidth memory including one or more memory bank groups, each of the one or more memory bank groups including a plurality of memory banks;
- for each request of the multiple requests to retrieve data from the memory:
  - generating a plurality of sub-requests based on a respective size of the data to be retrieved using the request;
  - generating a sequence of interleaved sub-requests that includes respective sub-requests of a first request to retrieve data from a first memory bank group interleaved among respective sub-requests of a second request to retrieve data from a second memory bank group; wherein the sequence of interleaved sub-requests are generated to mitigate idle cycles of the memory by avoiding any two consecutive sub-requests in the sequence of interleaved sub-requests being routed to a same memory bank group, wherein generating the sequence of interleaved sub-requests comprises:
    - determining that a first sub-request in the sequence is a sub-request of the first request to retrieve data from the first memory bank group; and
    - in response, selecting, as a second sub-request that follows the first sub-request in the sequence, a sub-request from the second request to retrieve data from the second memory bank group different from the first memory bank group;
- receiving, based on the sequence of interleaved sub-requests, interleaved response data comprising portions of data responsive to each of the multiple requests interleaved with one another;
- generating, for each request, respective response data that includes only the portions of the interleaved response data that are associated with the request; and
- processing, using the neural network implemented on the hardware circuit, the respective response data to generate a neural network output.

19. The non-transitory machine-readable storage device of claim 18, wherein the hardware circuit comprises a reorder buffer and wherein generating the respective response data comprises:
- receiving, by the reorder buffer, the interleaved response data, wherein the portions of data responsive to each of the multiple requests are interleaved in an order that coincides with the sequence of interleaved sub-requests; and
- reordering, by the reorder buffer, the interleaved response data to generate the respective response data each only including portions of data responsive to the corresponding request.

20. The non-transitory machine-readable storage device of claim 19, wherein the received interleaved response data is stored in a queue of the reorder buffer, the queue being managed based on first-in-first-out logic; and
- wherein each portion of data of the received interleaved response data is moved to a respective location in the queue according to the corresponding request.

* * * * *